Aug. 21, 1962  J. F. CONNORS  3,049,876
ANNULAR ROCKET MOTOR AND NOZZLE CONFIGURATION
Filed March 30, 1960

INVENTOR
JAMES F. CONNORS

BY

ATTORNEY

Aug. 21, 1962 J. F. CONNORS 3,049,876
ANNULAR ROCKET MOTOR AND NOZZLE CONFIGURATION
Filed March 30, 1960 5 Sheets-Sheet 2

INVENTOR
JAMES F. CONNORS
BY
ATTORNEY

Aug. 21, 1962  J. F. CONNORS  3,049,876
ANNULAR ROCKET MOTOR AND NOZZLE CONFIGURATION
Filed March 30, 1960

INVENTOR
JAMES F. CONNORS

BY

ATTORNEY

Aug. 21, 1962 J. F. CONNORS 3,049,876
ANNULAR ROCKET MOTOR AND NOZZLE CONFIGURATION
Filed March 30, 1960 5 Sheets-Sheet 4

INVENTOR
JAMES F. CONNORS
BY
ATTORNEY

Aug. 21, 1962 J. F. CONNORS 3,049,876
ANNULAR ROCKET MOTOR AND NOZZLE CONFIGURATION
Filed March 30, 1960 5 Sheets-Sheet 5

INVENTOR
JAMES F. CONNORS

BY

ATTORNEY

United States Patent Office 3,049,876
Patented Aug. 21, 1962

3,049,876
ANNULAR ROCKET MOTOR AND NOZZLE CONFIGURATION
James F. Connors, North Olmsted, Ohio, assignor to the United States of America as represented by the Administrator of the National Aeronautics and Space Administration
Filed Mar. 30, 1960, Ser. No. 18,776
9 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention concerns an annular rocket and nozzle configuration that may be used for large thrust rockets such as might be required for satellite or space-vehicle boosters. Previous to this invention, in order to achieve a specified high thrust level, a previously developed motor would be scaled up or a number of smaller motors were clustered together to produce the desired thrust. The attendant disadvantages of the two above schemes are quite apparent and serious in nature. One large motor becomes quite long and is inherently poor stabilitywise in that the thrust is applied to the airframe at one point on the centerline. A large heavy structure then must transmit this force radially outward to the supporting components of the fuselage. Gimballing of such a large motor leads to large flat base areas with accompanying drag and base burning problems. Clustering a large number of smaller rocket motors together produces significant reduction in nozzle length due to a cascade effect. However, this scheme is beset with jet interaction, base burning, and base drag problems. The complexity of having many individual rocket motors is obviously great, resulting in poor overall control and reliability.

The present invention can be likened to an arrangement of a cluster of rocket motors arranged in a circular ring about the missile's axis, and the individual motors are then integrated into one annular combustor and nozzle configuration. As an example, in the invention herein disclosed the main missile body comprises a payload located at the nose of the main missile body having storage tanks for the fuel and the oxidant within the missile body and turbopumps adjacent the rear of the main body. These turbopumps pump the oxidant and fuel through radial passageways to an annular reservoir. From this reservoir, the fuel and oxidant then flow through an annular injector and on into the combustor and nozzle configuration. The particular rocket design may be that of the conventional convergent-divergent nozzle but a more preferred arrangement would be the utilization of a combination of internal and external supersonic flow expansion and the subsequent use of the penshaped nozzle disclosed in applicant's co-pending U.S. application, Serial No. 914, filed January 6, 1960.

An additional feature of this annular nozzle configuration is that it lends itself to the adaptability of steering or thrust vectoring flaps which can be located 90° apart on the trailing edge of the rocket to deflect the flow locally on the nozzle periphery. In this case the radius from the missile axis serves to create a large restoring moment from a relatively small component of force.

An object of this invention is a high thrust rocket configuration.

Another object of the invention is to provide a high thrust rocket engine which has a relatively short length.

An additional object of the invention is to provide a high thrust rocket engine which has higher off-design thrust performance, particularly at take-off.

A further object of this invention is to provide a high thrust rocket engine that has no jet interaction.

A still further object of this invention is to provide a high thrust rocket engine which has no base burning problem.

A still additional object of this invention is to provide a high thrust rocket engine which has low drag due to boattailing of the fuselage.

Still another object of the invention is to provide a high thrust rocket engine which has better distribution of thrust to the missile structure to enable improved stability and control.

Other objects and many attendant advantages of the present invention will be apparent from the following detailed description when taken together with the accompanying drawings in which.

Figure 1:
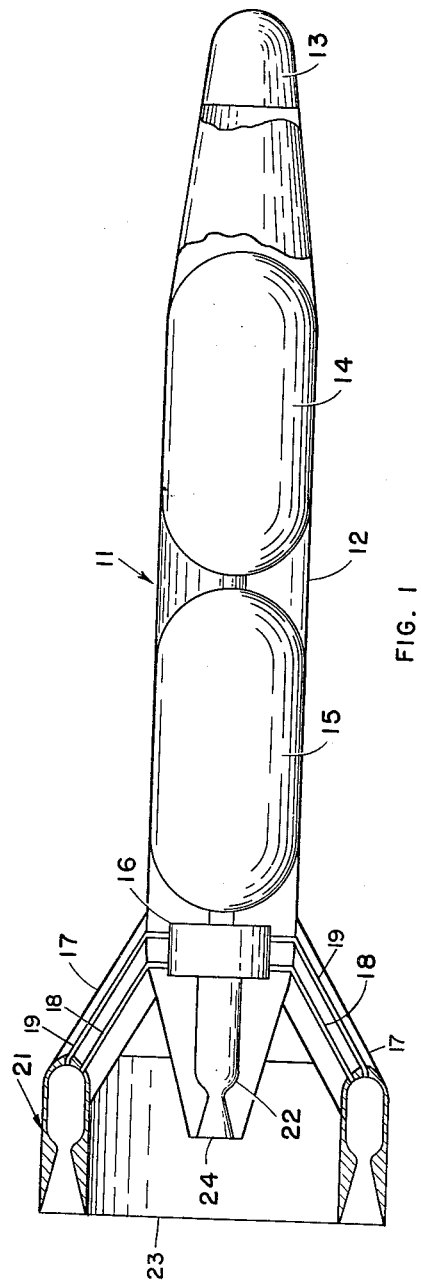
FIG. 1 is a partially-sectioned pictorial view of a missile utilizing the annular rocket nozzle configuration.

Referring now to the drawings wherein like reference characters designate like or corresponding parts throughout the several views, there is shown in FIG. 1 a missile 11 having a payload 13 and a fuselage 12 which has therein tanks 14 and 15 for the fuel and oxidant, respectively. The fuel and oxidant are pumped by means of the turbopumps 16 through lines 18 and 19, respectively, to the annular rocket 21. The fuel and oxidant lines 18 and 19 are contained in a plurality of struts 17 which also serves to support the annular rocket 21. The exhaust from the turbopump 16 flows through a convergent-divergent nozzle 22 and exits at the end 24 of the fuselage 12. As can readily be seen, the annular rocket 21 utilizes in this particular instance a convergent-divergent nozzle effect which has an exit plane 23 downstream of the fuselage end 24. Additionally, it is seen that the radius of the rocket nozzle is considerably larger than the radius of the fuselage body.

Figure 2:
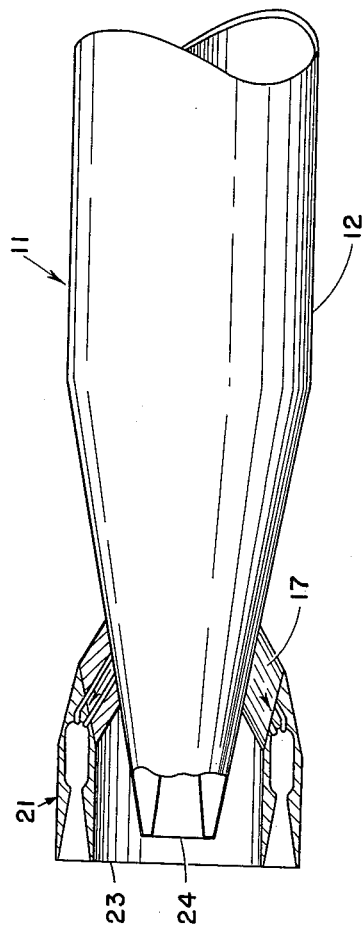
FIG. 2 is a partially-sectioned pictorial view of an annular rocket wherein its radius approaches the radius of the fuselage body.

The missile 11 shown in FIG. 2 is essentially the same as the one previously discussed in FIG. 1, the difference between the two configurations being that the configuration shown in FIG. 1 has an annular rocket, wherein the radius of the rocket is considerably larger than that of the fuselage whereas the configuration shown in FIG. 2 has the annular rocket approximating the size of the fuselage.

Figure 3:
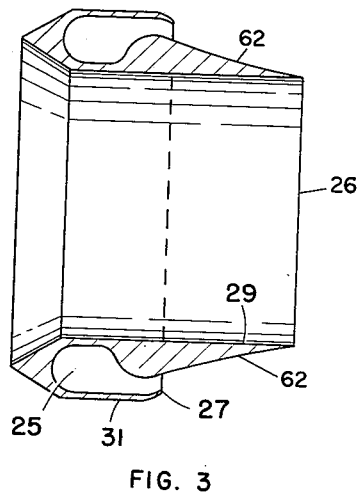
FIG. 3 is a partially-sectioned view of an annular rocket utilizing a penshaped exit having internal and external expansion.
Figure 4:
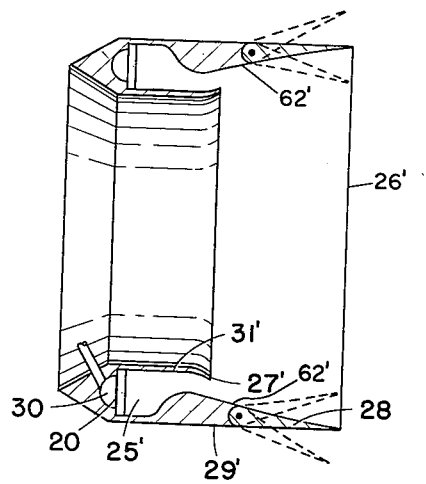
FIG. 4 is a partially-sectioned pictorial view of an annular nozzle using the penshaped exit and having thrust vectoring flaps.

Referring now to FIGS. 3 and 4, wherein the adaptation of the penshaped exhaust nozzle shown and disclosed in applicant's co-pending application, Serial No. 914, filed January 6, 1960 is applied to the annular rocket concept of the instant invention. As seen in FIG. 3, the rocket configuration comprises an annular structure having an inner combustor-nozzle member 29 and an outer combustor-nozzle member 31. The outer member 31 terminates as a lip 27 and the inner member 29 terminates as a circular trailing end 26. The propellant used is caused to ignite in the combustor 25 which is an area provided between the inner member 29 and the outer member 31. The exhaust gas flow from the combustion that occurs in the combustor 25 is caused by the lip 27 on the outer surface 31 to have an internal-external expansion with internal expansion up to the lip 27 and external free nozzle flow expansion occurring downstream of the lip 27 on surface 62 of the inner member 29. Due to this particular configuration, better off-design operating conditions are obtained.

The annular rocket configuration shown in FIG. 4 has substantially the same operating characteristics as the annular rocket configuration shown in FIG. 3; however, the relative position of the rocket components have been reversed. For example, a combustor-nozzle member 29' having an external expansion surface 62' is outwardly positioned with respect to a combustor-nozzle member 31'. Members 29' and 31' provide for a combustor area 25'. For both configurations shown in FIGS. 3 and 4, the trailing ends 26 and 26' are downstream of the lips 27 and 27', respectively. A further difference between FIG. 3 and FIG. 4 is the addition of vectoring flaps 28 on the expansion surface 29. Usually the vectoring flaps are situated 90° apart on the periphery of the annular rocket configuration and can be actuated by any conventional means (not shown). The use of vectoring flaps is particularly suited to the penshape exhaust exit and serves as an excellent means of control for the missile utilizing the annular rocket configuration. It is to be noted that in FIG. 4, the injector head 20 and annular reservoir 30 for the propellant mixture are additionally shown, though this figure is used mainly to illustrate the particular penshape nozzle configuration and use of vectoring flaps in detail.

Figure 5:
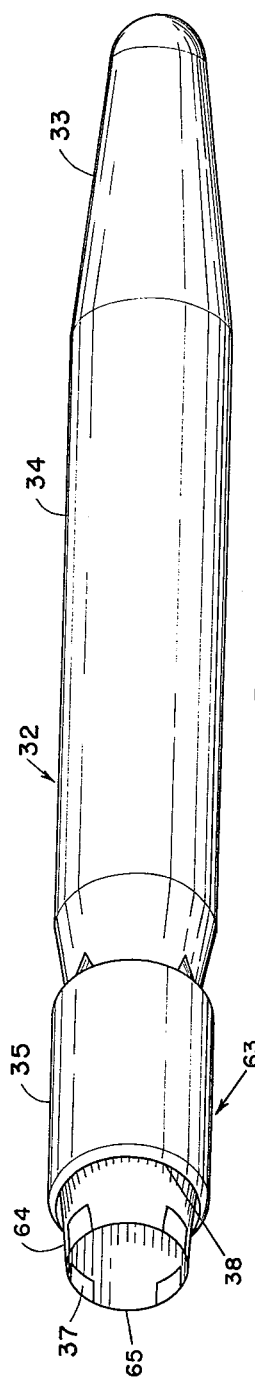
FIG. 5 is a pictorial view of a rocket utilizing an annular rocket configuration that is flush with the fuselage.

Referring to FIG. 5, a missile 32 is shown having an annular rocket 63 having the same maximum radius as that of the fuselage 34 of the missile. As can be seen, the missile 32 comprises a nose cone 33 and a fuselage 34 which would house the turbopumps and fuel tanks. The annular rocket motor 63 comprises a structure having an outer combustor-nozzle member 35 having a lip 38 and an inner combustor-nozzle member of which only the nozzle expansion surface 64 can be clearly seen. The surface 64 terminates as a circular trailing end 65 downstream of the lip 38. In addition, the rocket motor 63 has vectoring flaps 37 situated on the external expansion surface 64.

Figure 6:
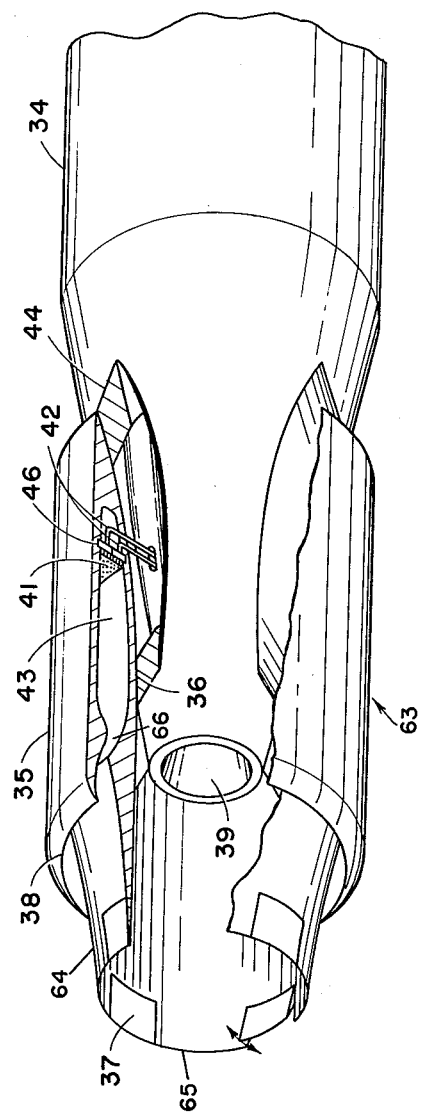
FIG. 6 is a partially-sectioned pictorial view of the annular rocket shown in FIG. 5.

FIG. 6 shows in detail the annular rocket motor 63 shown pictorially in FIG. 5. The actual nozzle configuration is similar to that seen in FIG. 3 having the addition of vectoring flaps. The annular rocket 63 is supported on the fuselage by means of strut members 44. These strut members 44 also serve to house the propellant lines 42 which lead from the turbopumps contained in the main fuselage 34. The rocket 63 is comprised of a structure having an outer combustor-nozzle member 35 and an inner combustor-nozzle member 36. Members 35 and 36 provide for a combustion area 43. An annular injector 41 is disposed in the combustion area 43 near the front portion thereof. The aforementioned propellants are pumped through lines 42 into an annular reservoir 46. The propellants are ejected by the injector 41 into the combustion area 43 where combustion is effected by any conventional technique. The members 35 and 36 also provide for a converging flow area downstream of the combustion area 43 which terminates as a throat 66. Downstream of the throat 66, members 35 and 36 provide for a divergent flow area with member 35 terminating as a lip 38 and member 36 terminating as a circular trailing end 65 longitudinally and inwardly positioned with respect to the lip 38. Rocket combustion gases from the combustion area 43 are forced into internal-external expansion between members 35 and 36 to substantially the vertical plane of the lip 38. External free exhaust nozzle flow expansion occurs on the surface 64 of member 36 downstream of the aforementioned vertical plane. The vectoring flaps 37 which are located on the inner expansion surface 36 serve to control and direct the external exhaust flow so as to maneuver the missile. The exhaust gases from the turbopump used to pump the fuel and oxidant are exhausted in the annular area 39 which is concentric to the annular rocket motor 63 and is actually an extension of the main fuselage body 34.

Figure 7:
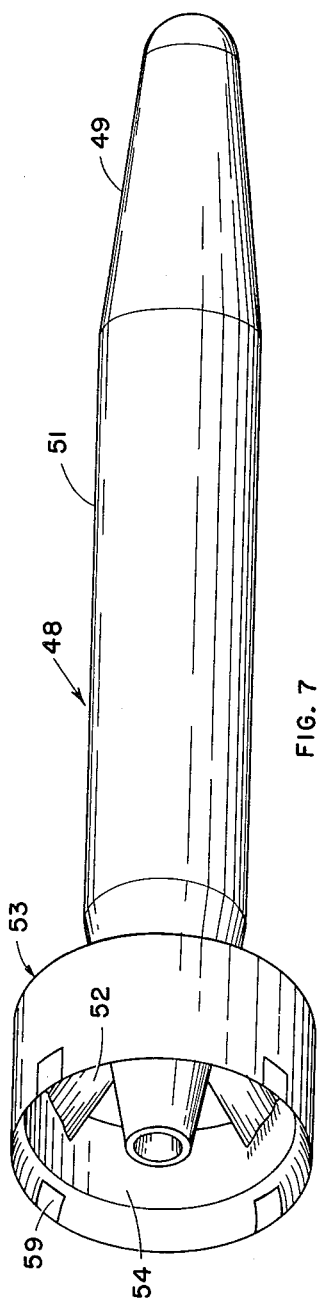
FIG. 7 is a pictorial view of a missile utilizing an annular rocket having a diameter larger than that of the fuselage.

Referring now to FIG. 7, a missile 48 is shown having a nose cone 49 and a main fuselage body 51. The annular rocket 53 is supported by the radial struts 52. Although as seen in this particular configuration the diameter of the annular rocket motor is larger than that of the fuselage 51 of the missile 48, the diameter may be the same as with the configuration shown in FIG. 5 and FIG. 6. The particular nozzle configuration of the annular rocket 53 is similar to that seen in FIG. 4.

Figure 8:
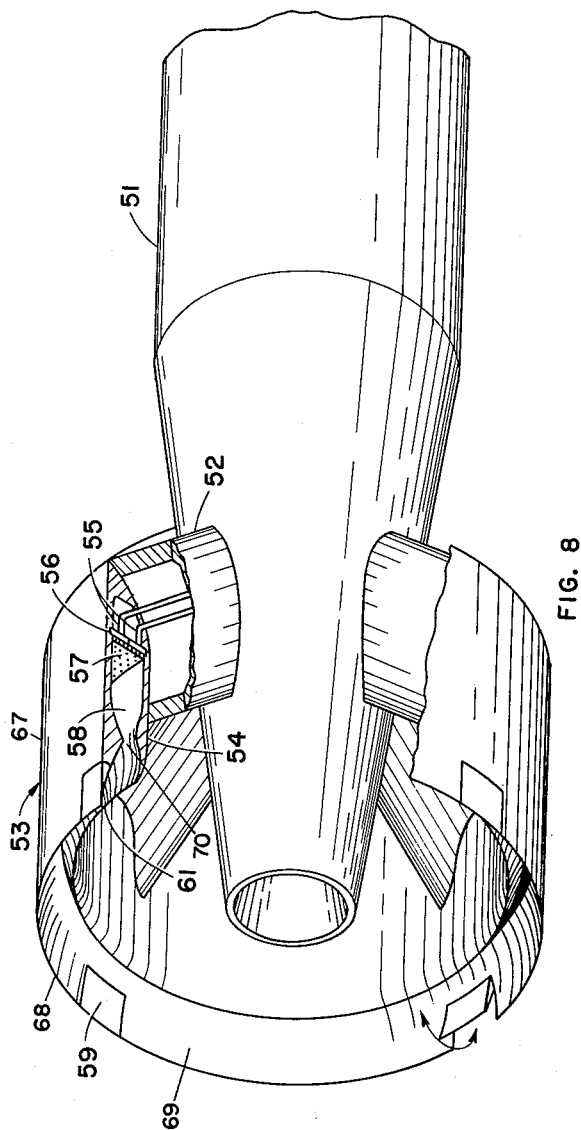
FIG. 8 is a partially-sectioned pictorial view of the annular rocket shown in FIG. 7.

As seen in FIG. 8, the annular rocket 53 is comprised of a structure having an outer combustor-nozzle member 67 and an inner combustor-nozzle member 54 forming a combustion area 58. An annular injector 57 is disposed in the combustion area 58. Propellant lines 55 interconnecting an internal turbopump (not shown) with an annular reservoir 56 are disposed in a plurality of struts 52. The propellants flow from the reservoir 56 through the injector 57 into the combustion area 58 where combustion is effected by any conventional techniques. Members 54 and 67 provide for a converging flow area from the combustion area 58 which terminates as a throat 70. Downstream of the throat 70, members 54 and 67 provide for a divergent flow area with member 54 terminating as a lip 61 and member 67 terminating as a circular trailing end 68 longitudinally and outwardly positioned with respect to the lip 61. Internal-external rocket exhaust flow expansion occurs between members 54 and 67 to substantially the vertical plane of lip 61. External free flow expansion occurs on the surface 69 of member 67 downstream of the aforementioned vertical plane. As can be seen, the outer expansion surface 53 has four thrust vectoring flaps 59 which serve to guide the direction of the missile 48.

Alternative to the annular injector that has been shown in the several views, a series of individual injector orifices extending around the circumference of the rocket may be used. Obviously, any modification and variations of the present invention are possible in the light of the above teachings. It is, therefore, to be understood that within the scope of the appended claims, the invention may be practiced otherwise than as specifically described.

What is claimed is:
1. A rocket propelled vehicle comprising
    an elongated body,
    propellant storage means disposed in said elongated body for storing propellants,
    an annular rocket motor combustion chamber, said chamber having an inner diameter larger than said fuselage at the rear terminus thereof,
    means for securing said chamber to said elongated body near the rear terminus thereof to provide a spatial relationship therebetween whereby passage of free stream air flow is permitted, exhaust nozzle means connected to said chamber, said nozzle means being in spatial relationship with the rear terminus of said elongated body whereby passage of free stream airflow is permitted, said nozzle means including first surface means for expansion of rocket nozzle exhaust flow thereon, second surface means disposed divergently opposite of said first surface means, said second surface means terminating downstream of said first surface means and downstream of the rear terminus of said elongated body, thereby effecting internal rocket nozzle flow expansion between said first surface means and said second surface means up to the end of said first surface means and external rocket nozzle free flow expansion on the remainder of said second surface means, and propellant flow means interconnected between said storage means and said combustion chamber for effecting a flow of propellant to said combustion chamber.

2. A rocket propelled vehicle comprising
a fuselage,
propellant storage means disposed in said fuselage for storing propellants,
an annular rocket motor combustion chamber, said chamber having an inner diameter larger than said fuselage at the rear terminus thereof,
means for securing said chamber to said fuselage near the rear terminus thereof to provide a spatial relationship therebetween whereby passage of free stream airflow is permitted,
exhaust nozzle means connected to said chamber, said nozzle means being in spatial relationship with the rear terminus of said fuselage whereby passage of free stream airflow is permitted, said nozzle means including
a circular exit lip,
a circular trailing end, said end being outwardly and longitudinally positioned with respect to said lip,
an outer shell joining said end and said combustion chamber,
an inner shell joining said lip and said combustion chamber,
means disposed in said combustion chamber for effecting a convergent flow surface, said means terminating as a throat,
a first expansion surface, said surface interconnecting said throat and said trailing end, and
a second expansion surface, said surface interconnecting said throat and said exit lip, and
propellant flow means interconnected between said storage means and said combustion chamber for effecting a flow of propellant to said combustion chamber.

3. The rocket propelled vehicle, as in claim 2, and including a turbopump disposed in said fuselage, and a convergent-divergent exhaust nozzle in communication with said turbopump, said exhaust nozzle terminating at the rear terminus of said fuselage and having an exit area substantially as large as the area of the fuselage rear terminus.

4. The rocket propelled vehicle, as claim 3, and including flap means disposed in said first surface means near the trailing end thereof for effecting vehicle thrust vector control by selective deflection of the rocket nozzle exhaust flow by deflection of said flap means into the nozzle exhaust flow.

5. A rocket propelled vehicle comprising
a fuselage,
propellant storage means disposed in said fuselage for storing propellants,
an annular rocket motor combustion chamber, said chamber having an inner diameter larger than said fuselage at the rear terminus thereof,
means for securing said chamber to said fuselage near the rear terminus thereof to provide a spatial relationship therebetween whereby passage of free stream airflow is permitted,
exhaust nozzle means connected to said chamber, said nozzle means being in spatial relationship with the rear terminus of said fuselage whereby passage of free stream airflow is permitted, said nozzle means including
a circular exit lip,
a circular trailing end, said end being inwardly and longitudinally positioned with respect to said lip,
an inner shell joining said end and said combustion chamber,
an outer shell joining said lip and said combustion chamber,
means disposed in said combustion chamber for effecting a convergent flow surface, said means terminating as a throat,
a first expansion surface, said surface interconnecting said throat and said trailing end, and
a second expansion surface, said surface interconnecting said throat and said exit lip, and
propellant flow means interconnected between said storage means and said combustion chamber for effecting a flow of propellant to said combustion chamber.

6. The rocket propelled vehicle, as in claim 5, and including a turbopump, and
nozzle means in communication with said turbopump for exhausting turbopump combustion products, said nozzle means having a convergent-divergent flow surface, said nozzle terminating at the rear terminus of said fuselage and having an exit area substantially as large as the area of the fuselage rear terminus.

7. The rocket propelled vehicle, as in claim 6, and including flap means disposed in said first surface means near the trailing end thereof for effecting vehicle thrust vector control by selective deflection of the rocket nozzle exhaust flow by deflection of said flap means into the nozzle exhaust flow.

8. A rocket propulsion device comprising
an annular combustion chamber,
an annular injector disposed in said combustion chamber,
means disposed in said combustion chamber for effecting a convergent flow surface, said means terminating as a throat,
a circular exit lip,
an inner shell joining said lip and said combustion chamber,
a circular trailing end, said end being longitudinally and outwardly positioned with respect to said lip,
an outer shell joining said end and said combustion chamber,
a first expansion surface, said surface interconnecting said throat and said trailing end, and
a second expansion surface, said surface interconnecting said exit and said throat.

9. A rocket propulsion device comprising
an annular combustion chamber,
an annular injector disposed in said combustion chamber,
means disposed in said combustion chamber for effecting a convergent flow surface, said means terminating as a nozzle throat,
a circular exit lip,
a circular trailing end, said end being inwardly and longitudinally positioned with respect to said lip,
an inner shell joining said end and said combustion chamber, an outer shell joining said lip and said combustion chamber,
a first expansion surface, said surface interconnecting said throat and said trailing end, and
a second expansion surface, said surface interconnecting said throat and said exit lip.

References Cited in the file of this patent

UNITED STATES PATENTS

| | | |
|---|---|---|
| 2,406,560 | Pope | Aug. 27, 1946 |
| 2,421,552 | Eksergian | June 3, 1947 |
| 2,589,548 | Imbert | Mar. 18, 1952 |
| 2,592,938 | McNaught | Apr. 15, 1952 |
| 2,672,726 | Wolf et al. | Mar. 23, 1954 |
| 2,704,645 | Colvin | Mar. 22, 1955 |
| 2,735,263 | Charshafian | Feb. 21, 1956 |
| 2,776,622 | Robert | Jan. 8, 1957 |
| 2,821,350 | Smurik | Jan. 28, 1958 |
| 2,831,320 | Duncan | Apr. 22, 1958 |
| 2,907,536 | Zborowski | Oct. 6, 1959 |
| 2,928,238 | Hawkins | Mar. 15, 1960 |
| 2,931,170 | Mittelstaedt | Apr. 5, 1960 |
| 2,962,934 | Seidner | Dec. 6, 1960 |

FOREIGN PATENTS

| | | |
|---|---|---|
| 1,036,205 | France | Apr. 22, 1953 |
| 74,261 | Netherlands | Mar. 15, 1954 |